United States Patent
Hann

(10) Patent No.: US 9,618,623 B2
(45) Date of Patent: Apr. 11, 2017

(54) SATELLITE RECEIVER MODULE FOR TELECOMMUNICATION EQUIPMENT

(71) Applicant: TELLABS OY, Espoo (FI)

(72) Inventor: Kenneth Hann, Espoo (FI)

(73) Assignee: CORIANT OY, Espoo (FI)

(*) Notice: Subject to any disclaimer, the term of this patent is extended or adjusted under 35 U.S.C. 154(b) by 592 days.

(21) Appl. No.: 14/088,692

(22) Filed: Nov. 25, 2013

(65) Prior Publication Data
US 2014/0145875 A1    May 29, 2014

(30) Foreign Application Priority Data
Nov. 26, 2012 (FI) .................................. 20126240

(51) Int. Cl.
| | |
|---|---|
| H04B 7/185 | (2006.01) |
| G01S 19/09 | (2010.01) |
| G01S 19/13 | (2010.01) |
| H04W 56/00 | (2009.01) |

(52) U.S. Cl.
CPC ............ *G01S 19/13* (2013.01); *H04W 56/00* (2013.01)

(58) Field of Classification Search
USPC ......... 342/352, 356, 357.21, 357.46, 357.76; 701/468, 470
See application file for complete search history.

(56) References Cited

U.S. PATENT DOCUMENTS

| | | |
|---|---|---|
| 2008/0075217 A1 | 3/2008 | Ilnicki et al. |
| 2008/0080562 A1 | 4/2008 | Burch et al. |
| 2010/0073228 A1 | 3/2010 | Smith |
| | (Continued) | |

FOREIGN PATENT DOCUMENTS

| | | |
|---|---|---|
| CN | 1637430 A | 7/2005 |
| EP | 2416519 | 2/2012 |
| | (Continued) | |

OTHER PUBLICATIONS

Finnish Search Report dated Aug. 28, 2013, corresponding to the Foreign Priority Application No. 20126240.
(Continued)

*Primary Examiner* — Dao Phan
(74) *Attorney, Agent, or Firm* — Young & Thompson

(57) ABSTRACT

A satellite receiver module (101) for telecommunication equipment includes circuitries (102, 103) configured to: receive timing information from one or more satellites, run at least a part of master-end functions of a synchronization protocol suitable for synchronizing master and slave clock-times over a data transfer network, and convert the timing information into timing messages that are accordant with the synchronization protocol. The satellite receiver module further includes a data interface (104) including a connector (105) for detachably attaching to a body device of the telecommunication equipment and for transferring a bit stream carrying the timing messages to the body device. Because the timing information received from the one or more satellites is converted into the timing messages that are accordant with the synchronization protocol, the timing information can be transferred among other possible digital data, e.g. location information, from the satellite receiver module to the body device.

17 Claims, 2 Drawing Sheets

(56) References Cited

U.S. PATENT DOCUMENTS

| | | | |
|---|---|---|---|
| 2010/0118894 A1* | 5/2010 | Aweya | G06F 1/0328 370/503 |
| 2010/0238940 A1 | 9/2010 | Koop et al. | |
| 2011/0261917 A1 | 10/2011 | Bedrosian | |
| 2012/0156987 A1 | 6/2012 | Nakayama | |
| 2012/0243529 A1 | 9/2012 | Sumikawa | |
| 2012/0275501 A1 | 11/2012 | Rotenstein | |

FOREIGN PATENT DOCUMENTS

| | | |
|---|---|---|
| EP | 2 458 739 A1 | 5/2012 |
| EP | 2 458 772 A2 | 5/2012 |
| WO | 2009/132456 | 11/2009 |

OTHER PUBLICATIONS

Xiao, et al.; "Analysis and Implementation of IEE 1588 Time Synchronizing Design of Bay Level in Digital Substation"; In: The International Conference on Advanced Power System Automation an Protection, Oct. 16, 2011; pp. 2380-2384, pp. 2380 chapter 2A, pp. 2381 Figure 2, pp. 2382 Chapter B and Figure 4, pp. 2383-2384 Chapter 5 and Figure 6.

M. Refan, et al.; Redundant GPS Time Synchronization Boards for Computer Networks, Telecommunications Forum (TELEFOR) 19th, Nov. 22, 2011, pp. 904-907, pp. 906 Figure 5 and Chaper V A.

Wang, et al.; Research and Design on Time Synchronization Technology of Smart Substation Based on IEEE 1588. In: Advanced Power System Automation and Protection, 2011 International Conference on Oct. 16, 2011, pp. 2244-2248, pp. 2245, Chapter 2.2.

IEEE Std. 1588-2008 (Revision of IEEE std. 1588-2002) IEEE Standard for a Precision Clock Synchronization Protocol for Networked Measurement and Control Systems. Jul. 24, 2008, p. 57 Table 7 for Time Source, p. 124-130, Chapters 13.3 and 13.6 for Sync Message and its Header, pp. 12-13, 42-48 and 102 for timestamp, timeinterval and timestamp creation.

Kopetz The Rationale for Time-Triggered Ethernet Real-Time Systems Symposium IEEE, Nov. 30, 2008, pp. 3-11, p. 8 Chapter Time-Triggered Message.

European Search Report, dated Jan. 26, 2015, from corresponding European application.

Search Report issued in Chinese Application No. 201310608950.8, dated Nov. 21, 2016.

\* cited by examiner

SATELLITE RECEIVER MODULE FOR TELECOMMUNICATION EQUIPMENT

FIELD OF THE INVENTION

The invention relates to a method for transferring timing information from a satellite receiver module of telecommunication equipment to a body device of the telecommunication equipment. Furthermore, the invention relates to a satellite receiver module, to telecommunication equipment, and to a computer program for transferring timing information from a satellite receiver module of telecommunication equipment to a body device of the telecommunication equipment.

BACKGROUND

In many cases it is advantageous that telecommunication equipment is modular so that the telecommunication equipment comprises a body device and one or more modules that can be detachably attached to the body device. The telecommunication equipment can be, for example but not necessarily, an internet protocol "IP" router, an Ethernet switch, an Asynchronous Transfer Mode "ATM" switch, and/or a MultiProtocol Label Switching "MPLS" switch. Each module can be, for example, a transceiver module or another module such as a satellite receiver module which may comprise a circuitry for receiving location and/or timing information from one or more satellites. The above-mentioned circuitry of the satellite receiver module can be, for example, a Global Navigation Satellite System "GNSS"-receiver that is configured to extract location and/or timing information from one or more received GNSS-signals. The GNSS can be, for example but not necessarily, the US Global Positioning System "GPS" or the Russian GLONASS-satellite system. The timing information is typically extracted from the received GNSS-signals in a form of a pulse per second "PPS"-signal which comprises successive and temporally equidistant timing pulses.

In many cases, the body device does not comprise connector pins or other connecting means that would be suitable for receiving the timing information, e.g. the PPS-signal, from the satellite receiver module. The body device may comprise connector pins or other connecting means that are suitable for receiving only the location information from the satellite receiver module.

SUMMARY

The following presents a simplified summary in order to provide a basic understanding of some aspects of various invention embodiments. The summary is not an extensive overview of the invention. It is neither intended to identify key or critical elements of the invention nor to delineate the scope of the invention. The following summary merely presents some concepts of the invention in a simplified form as a prelude to a more detailed description of exemplifying embodiments of the invention.

In accordance with the invention there is provided a new satellite receiver module for telecommunication equipment, wherein the satellite receiver module is a plug-in unit connectable to a body device of the telecommunication equipment. A satellite receiver module according to the invention comprises a first circuitry for receiving timing information from one or more satellites, a second circuitry for running at least a part of master-end functions of a synchronization protocol and for converting the timing information into timing messages that are accordant with the synchronization protocol, the synchronization protocol being suitable for synchronizing master and slave clock-times over a data transfer network, and a data interface comprising a connector for detachably attaching to the body device of the telecommunication equipment and for transferring a bit stream carrying the timing messages to the body device of the telecommunication equipment.

Because the timing information received from the one or more satellites is converted into the timing messages that are accordant with the synchronization protocol suitable for synchronizing master and slave clock-times over a data transfer network, the timing information can be transferred among other possible digital data, for example location information, from the satellite receiver module to the body device of the telecommunication equipment. The synchronization protocol can be, for example, according to the IEEE 1588 specification (Institute of Electrical and Electronics Engineers).

In accordance with the invention there is provided also new telecommunication equipment. Telecommunication equipment according to the invention comprises a satellite receiver module according to the invention, and a body device comprising:

a data interface comprising a connector for detachably attaching to the corresponding connector of the data interface of the satellite receiver module, and a processing system for running at least a part of slave-end functions of the synchronization protocol on the basis of the timing messages received from the satellite receiver module so as to regenerate the timing information received by the satellite receiver module from the one or more satellites.

In accordance with the invention there is provided also a new method for transferring timing information from a satellite receiver module of telecommunication equipment to a body device of the telecommunication equipment, where the satellite receiver module is a plug-in unit detachably attached to the body device. A method according to the invention comprises:

receiving, at the satellite receiver module, the timing information from one or more satellites, running, in the satellite receiver module, at least a part of master-end functions of a synchronization protocol suitable for synchronizing master and slave clock-times over a data transfer network, converting, in the satellite receiver module, the timing information into timing messages that are accordant with the synchronization protocol, transferring a bit stream carrying the timing messages from the satellite receiver module to the body device, and running, in the body device, at least a part of slave-end functions of the synchronization protocol so as to regenerate the timing information received from the one or more satellites.

In accordance with the invention there is provided also a new computer program for transferring timing information from a satellite receiver module of telecommunication equipment to a body device of the telecommunication equipment, where the satellite receiver module is a plug-in unit detachably attached to the body de-vice. A computer program according to the invention comprises computer executable instructions for controlling a programmable processor of the satellite receiver module to:

run at least a part of master-end functions of a synchronization protocol suitable for synchronizing master and slave clock-times over a data transfer network, convert timing information received from one or more satellites into timing messages accordant with the synchronization protocol, and control a data interface of the satellite receiver module to transfer a bit stream carrying the timing messages to the body device.

A computer program product according to the invention comprises a non-volatile computer readable medium, e.g. a compact disc ("CD"), encoded with a computer program according to the invention.

A number of exemplifying embodiments of the invention are described in accompanied dependent claims.

Various exemplifying embodiments of the invention both as to constructions and to methods of operation, together with additional objects and advantages thereof, will be best understood from the following description of specific exemplifying embodiments when read in connection with the accompanying drawings.

The verb "to comprise" is used in this document as an open limitation that neither excludes nor requires the existence of also un-recited features. The features recited in depending claims are mutually freely combinable unless otherwise explicitly stated.

BRIEF DESCRIPTION OF FIGURES

The exemplifying embodiments of the invention and their advantages are explained in greater detail below with reference to the accompanying drawings, in which.

DESCRIPTION OF EXEMPLIFYING EMBODIMENTS

Figure 1:
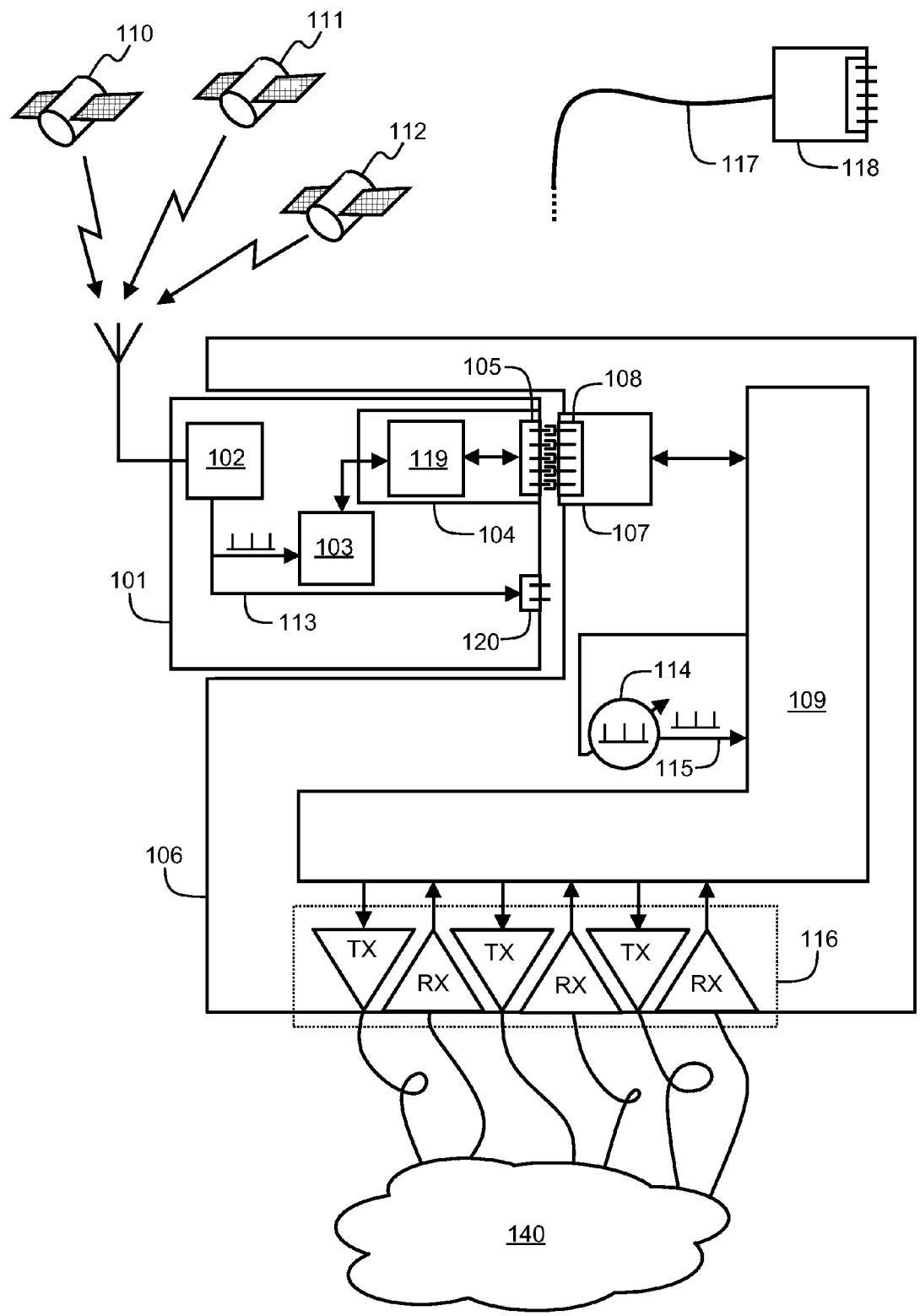
FIG. 1 shows a schematic illustration of telecommunication equipment according to an exemplifying embodiment of the invention.

FIG. 1 shows a schematic illustration of telecommunication equipment according to an exemplifying embodiment of the invention. The telecommunication equipment comprises a satellite receiver module 101 and a body device 106. The body device can be, for example, an internet protocol "IP" router, an Ethernet switch, an Asynchronous Transfer Mode "ATM" switch, a MultiProtocol Label Switching "MPLS" switch. The body device may comprise ingress and egress ports 116 for connecting to a data transfer network 140. The satellite receiver module 101 comprises a first circuitry 102 for receiving one or more signals from one or more satellites 110, 111, and 112 and for extracting timing information 113 from the received one or more signals. The first circuitry 102 can be configured to extract also location information from the one or more signals received from the satellites. The satellites can be, for example, Global Navigation Satellite System "GNSS"-satellites and the first circuitry 102 can be, for example, a GNSS-receiver that is configured to extract location and timing information from one or more received GNSS-signals. The satellite receiver module 101 can be, for example, an SFP GNSS-module (Small Form factor Pluggable). The GNSS can be, for example but not necessarily, the US Global Positioning System "GPS" or the Russian GLONASS-satellite system. The timing information 113 can be extracted from the one or more received GNSS-signals in a form of, for example, a pulse per second "PPS"-signal which comprises successive and temporally equidistant timing pulses. The satellite receiver module 101 comprises a second circuitry 103 for running at least a part of master-end functions of a synchronization protocol that is suitable for synchronizing master and slave clock-times over a data transfer network. The synchronization protocol can be, for example, according to the IEEE 1588 specification (Institute of Electrical and Electronics Engineers). The second circuitry 103 is configured to convert the timing information 113 into successive timing messages that are accordant with the synchronization protocol. The satellite receiver module 101 comprises a data interface 104 that comprises a connector 105 for detachably attaching to the body device 106 and for transferring, to the body device, a bit stream carrying the timing messages.

The body device 106 comprises a data interface 107 that comprises a connector 108 for detachably attaching to the corresponding connector 105 of the data interface 104 of the satellite receiver module 101. In the exemplifying case illustrated in FIG. 1, the connectors 105 and 107 are electrical connectors comprising connector poles capable of providing galvanic couplings for electrical data transfer between the satellite receiver module 101 and the body device 106. It is also possible that the data interfaces 104 and 107 comprise optical interfaces for optical data transfer between the satellite receiver module 101 and the body device 106. The body device 106 comprises a processing system 109 for running at least a part of slave-end functions of the above-mentioned synchronization protocol on the basis of the timing messages received from the satellite receiver module 101 so as to regenerate the above-mentioned timing information. The body device 106 may comprise a controllable signal generator 114 that is controlled by the slave-end functions of the synchronization protocol in order to produce the regenerated timing information 115.

It is to be noted that the above-mentioned IEEE 1588 synchronization protocol is not the only possible choice for the synchronization protocol between the satellite receiver module 101 and the body device 106, but it is also possible to use other such synchronization protocols that are suitable for synchronizing master and slave clock-times maintained in master and slave network elements interconnected via a data transfer network. The synchronization protocol can be a synchronization protocol defined in a specification issued by a standardization body such as e.g. the IEEE, the International Telecommunication Union "ITU", the European Telecommunication Standardization Institute "ETSI", or the American National Standardization Institute "ANSI", or the synchronization protocol can be a suitable proprietary protocol that is not defined by any standardization body but that is suitable for synchronizing master and slave clock-times maintained in master and slave network elements interconnected via a data transfer network. The principle utilized in the telecommunication equipment illustrated in FIG. 1 is to use a synchronization protocol of the kind described above between the satellite receiver module 101 and the body device 106.

In the IEEE 1588 synchronization protocol, a difference Δγ between slave and master clock-times is computable according to the equation:

$$\Delta\phi=((T_2-T_1)-(T_4-T_3))/2, \qquad (1)$$

where $T_1$ is the value of the master clock-time at a transmission moment of a first timing message from a master-end, $T_2$ is the value of the slave clock-time at a reception moment of the first timing message at a slave-end, $T_3$ is the value of the slave clock-time at a transmission moment of a second timing message from the slave-end, and $T_4$ is the value of the master clock-time at a reception moment of the second timing message at the master-end. It should be noted that the words "first" and "second" in conjunction with the above-mentioned first and second timing messages do not indicate necessarily the temporal order of these timing messages but the words "first" and "second" are used as labels only. The first timing message can be set to contain the value $T_1$ or, alternatively, a separate message carrying the value $T_1$ can be transferred from the master-end to the slave-end. The master-end can be configured to send, to the slave-end, a message carrying the value $T_4$ after receiving the second timing message. It is also possible that the value $T_4$ is transferred to the slave-end in a new first timing message that belongs to the next control period comprising the new first timing message from the master-end to the slave-end and a new second timing message from the slave-end to the master-end.

The above-presented equation (1) is based on the assumption that the value of the slave clock-time is $T_1+\Delta\phi$ at the transmission moment of the first timing message from the master-end and thus the value $T_2$ of the slave clock-time at the reception moment of the first timing message at the slave-end is $T_1+\Delta\phi+D_1$, where $D_1$ is the data transfer delay from the master-end to the slave-end. Correspondingly, the value of the master clock-time is assumed be $T_3-\Delta\phi$ at the transmission moment of the second timing message from the slave-end and thus the value $T_4$ of the master clock-time at the reception moment of the second timing message at the master-end is $T_3-\Delta\phi+D_2$, where $D_2$ is the data transfer delay from the slave-end to the master-end. Equation (1) is based on the assumption that the transfer delay $D_1$ from the master-end to the slave-end equals to the transfer delay $D_2$ in the opposite direction from the slave-end to the master-end, i.e. $D_1=D_2=D$. Solving for $\Delta\phi$ from equations $T_2=T_1+\Delta\phi+D$ and $T_4=T_3-\Delta\phi+D$ yields the equation (1).

In the telecommunication equipment illustrated in FIG. 1, the assumption $D_1=D_2=D$ is valid with a good accuracy between the satellite receiver module 101 and body device 106, where the satellite receiver module represents the master-end and the body device represents the slave-end. In the telecommunication equipment illustrated in FIG. 1, the above-mentioned difference $\Delta\phi$ represents the difference between the master clock-time corresponding to the timing information 113 and the regenerated slave clock-time corresponding to the regenerated timing information 115. In an exemplifying case, where the timing information 113 is a train of temporally successive timing pulses, the master clock-time can be defined to be cumulative value that is changed, incremented or decremented, with a predetermined amount in response to each timing pulse of the timing information 113. Correspondingly, the regenerated slave clock-time can be defined to be a cumulative value that is changed with the pre-determined amount in response to each timing pulse of the regenerated timing information 115.

In the above-described exemplifying case, the processing system 109 is configured to compute the difference $\Delta\phi$ on the basis of the values of the above-mentioned master and slave clock-times at the transmission and reception moments of the timing messages. Furthermore, the processing system 109 is configured to control the controllable signal generator 114 on the basis of the computed difference $\Delta\phi$.

In the telecommunication equipment illustrated in FIG. 1, the satellite receiver module 101 is directly connected to the body device 106 and thus the data transfer delay between them, i.e. between the master- and slave-ends, is small, i.e. $D_1\approx0$ and $D_2\approx0$. In telecommunication equipment according to an exemplifying embodiment of the invention, the above-presented assumption is utilized in a way that the difference $\Delta\phi$ between the slave and master clock-times is computed according to the equation:

$$\Delta\phi=T_2-T_1, \qquad (2)$$

where $T_1$ is the value of the master clock-time at a transmission moment of a timing message from the master-end, i.e. from the satellite receiver module 101, and $T_2$ is the value of the slave clock-time at a reception moment of the timing message at the slave-end, i.e. at the body device 106. In this case, there is no need for bi-directional transfer of timing messages between the satellite receiver module 101 and the body device 106. In cases where the IEEE 1588 synchronization protocol is being used, the second circuitry 103 of the the satellite receiver module 101 needs to be configured to run only a part of the master-end functions of the IEEE 1588 synchronization protocol and, correspondingly, the processing system 109 of the body device 106 needs to be configured to run only a part of the slave-end functions of the IEEE 1588 synchronization protocol.

In telecommunication equipment according to an exemplifying embodiment of the invention, the second circuitry 103 of the satellite receiver module 101 is configured to generate the timing messages so that each timing message comprises a first field including first bits and a value contained by the first field is a cumulative value that has been changed, incremented or decremented, with a pre-determined amount for each one of the successive timing pulses contained by the timing information 113. In conjunction with the IEEE 1588 synchronization protocol, each timing message can be arranged to comprise a first field including first bits called most significant bits "MSB" which indicate full seconds of the master clock time, and a second field including second bits called least significant bits "LSB" which indicate the non-integer part of the master clock time in nanoseconds. In this case, the MSB-part can be a cumulative value that is changed with the pre-determined value for each one of the successive timing pulses and the LSB-part can be zero. In a case, where a timing message is generated for each timing pulse and the arrival rate of the timing pulses is one per second, i.e. a pulse per second "PPS" signal, the MSB-part of each timing message can be the MSB-part of the previous timing message incremented by one. In order to minimize processing delays, the second circuitry 103 of the satellite receiver module 101 is advantageously configured to generate each timing message in advance prior to receiving the corresponding timing pulse and to include the timing message in the bit stream to be transferred to the body device 106 in response to the reception of the corresponding timing pulse.

In telecommunication equipment according to an exemplifying embodiment of the invention, the data interface 104 of the satellite receiver module 101 is configured to use Ethernet protocol for transferring the bit stream carrying the timing messages to the body device 106, and the data interface 107 of the body device is configured to support the Ethernet protocol. In this exemplifying case, the data interface 104 of the satellite receiver module 101 may comprise a circuitry 119 containing an Ethernet Media Access Control "MAC" circuit and an Ethernet physical media interface "PHY" circuit. The data interface 107 of the body device may as well comprise Ethernet MAC- and PHY-circuits.

In telecommunication equipment according to an exemplifying embodiment of the invention, the second circuitry 103 of the satellite receiver module 101 is configured to generate a source indicator message indicating that the timing information carried by the timing messages is received from a satellite system comprising the satellites 110-112, and to set the bit stream to be transferred to the body device 106 to carry the source indicator message. The information indicating the source of the timing information can be used by the body device 106 when, for example, the body device has to select between the timing information received via the data interface 107 and other timing information received from a source other than satellites.

In telecommunication equipment according to an exemplifying embodiment of the invention, the second circuitry 103 of the satellite receiver module 101 is configured to generate a hop count message indicating that a number of data transfer links, via which the timing information has been transferred, is zero, and to set the bit stream to be transferred to the body device 106 to carry the hop count message. The information indicating the hop count can be used by the body device 106 when, for example, the body device has to select between the timing information received via the data interface 107 and other timing information received from another source.

In telecommunication equipment according to an exemplifying embodiment of the invention, the second circuitry 103 of the satellite receiver module 101 is configured to set bits of the bit stream that is transferred to the body device 106 to indicate the timing messages, and possible source indicator and/or hop count messages, when the bit stream is in a form corresponding to a line-code used by the data interfaces 104 and 107. The line-code defines the manner the bit stream is encoded to properties of an analogue signal of the connectors 105 and 108. In this case, the timing messages can be read in the body device directly from the received bit stream already when the received bit stream is in the form corresponding to the line-code. In this case, the Ethernet MAC-circuit is not necessary in the satellite receiver module 101 for sending timing messages to the body device 106.

In telecommunication equipment according to an exemplifying embodiment of the invention, the connector 108 of the data interface 107 of the body device 106 is capable of being detachably attached to a data transfer link of a data transfer network and the data interface 107 of the body device is capable of receiving data traffic from the data transfer link. In the exemplifying case illustrated in FIG. 1, a connector 118 of a data transfer link 117 can be installed in the connector 108 of the body device 106, and the data interface 107 of the body device is capable of receiving data traffic from the data transfer link 117. The data traffic can be, for example but not necessarily, Ethernet data traffic.

Advantageously, the satellite receiver module 101 is provided with a connector 120 for transferring the timing information 113 directly out from the satellite receiver module and/or the connector 105 is provided with means, e.g. pins, for transferring the timing information directly out from the satellite receiver module, because there can be body devices that are provided with corresponding means for receiving the timing information 113. The body device 106 does not, however, comprise such means and thus the timing information 113 is transferred to the body device 106 with the aid of a synchronization protocol run with the aid of the digital data transfer taking place through the data interfaces 104 and 108.

The first and second circuitries 102 and 103 and the data interface 104 of the satellite receiver module 101 can be physically implemented with a single integrated component or with two or more separate interconnected components. The physical implementation of the first and second circuitries 102 and 103 and the data interface 104 may comprise one or more programmable processor circuits, one or more dedicated hardware circuits such as an application specific integrated circuit "ASIC", and/or one or more field programmable logic circuits such as a field programmable gate array "FPGA". In conjunction with some exemplifying embodiments of the invention, certain functionalities of the first and/or second circuitries 102 and 103 and/or the data interface 104 can be implemented, for example, with a same programmable hardware. Thus, in the physical implementation, the first and/or second circuitries 102 and 103 and/or the data interface 104 are not necessarily separate in the way shown in FIG. 1. It is to be noted that FIG. 1 is presented for illustrative purposes. The processing system 109 of the body device 106 can be implemented with one or more programmable processor circuits, one or more dedicated hardware circuits such as an application specific integrated circuit "ASIC", one or more field programmable logic circuits such as a field programmable gate array "FPGA", or a combination of these.

Figure 2:
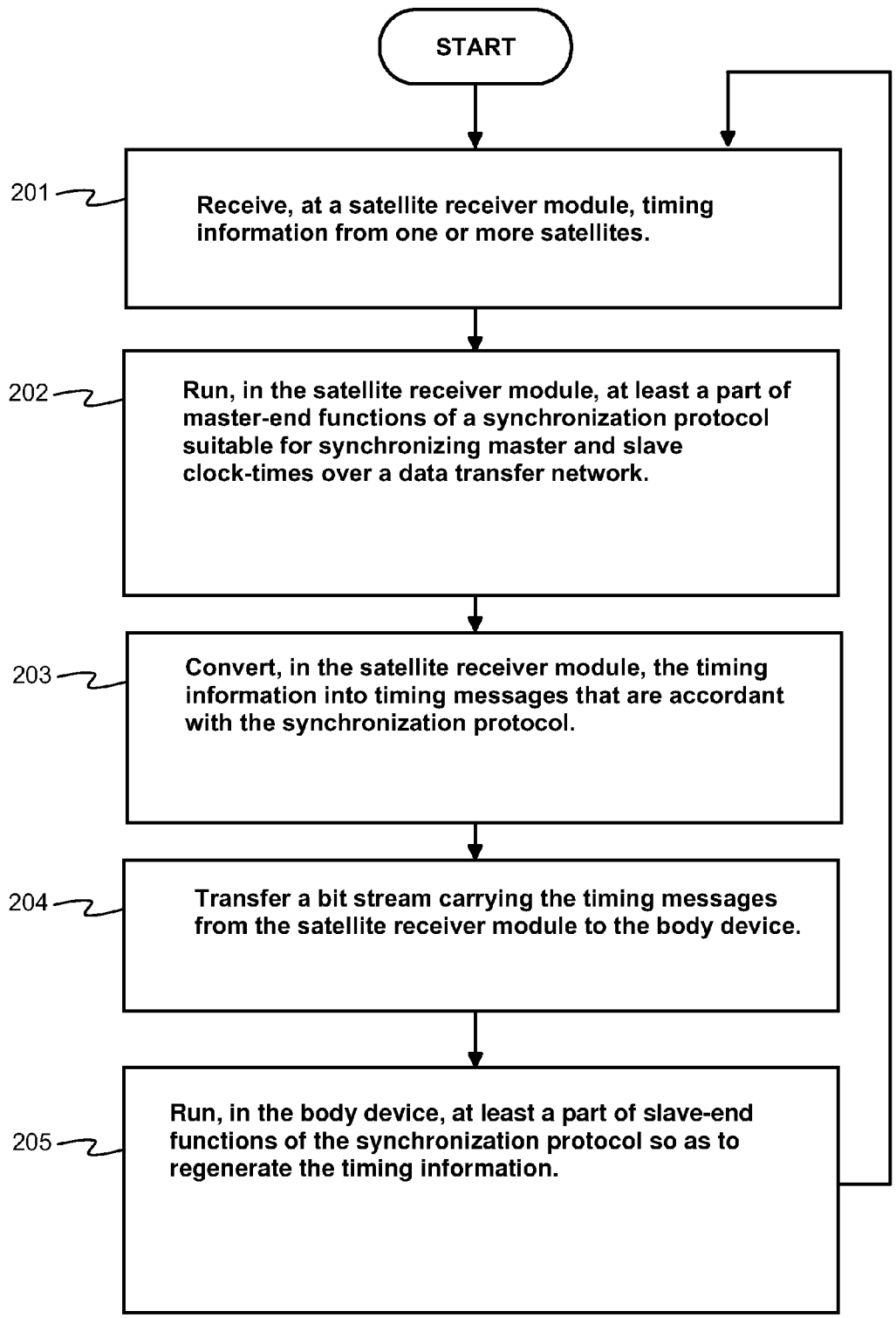
FIG. 2 shows a flow chart of a method according to an exemplifying embodiment of the invention for transferring timing information from a satellite receiver module of telecommunication equipment to a body device of the telecommunication equipment.

FIG. 2 shows a flow chart of a method according to an exemplifying embodiment of the invention for transferring timing information from a satellite receiver module of telecommunication equipment to a body device of the telecommunication equipment. The satellite receiver module is a plug-in unit connected to the body device.

The above-mentioned method comprises the following actions:
action 201: receiving, at the satellite receiver module, timing information from one or more satellites, the satellite receiver module being detachably attached to a body device of the telecommunication equipment,
action 202: running, in the satellite receiver module, at least a part of master-end functions of a synchronization protocol suitable for synchronizing master and slave clock-times over a data transfer network,
action 203: converting, in the satellite receiver module, the timing information into timing messages that are accordant with the synchronization protocol,
action 204: transferring a bit stream carrying the timing messages from the satellite receiver module to the body device, and
action 205: running, in the body device, at least a part of slave-end functions of the synchronization protocol so as to regenerate the timing information received from the one or more satellites.

A method according to an exemplifying embodiment of the invention further comprises generating a source indicator message indicating that the timing information carried by the timing messages is received from a satellite system comprising the one or more satellites, and setting the bit stream to carry the source indicator message.

A method according to an exemplifying embodiment of the invention further comprises generating a hop count message indicating that a number of data transfer links, via which the timing information has been transferred, is zero, and setting the bit stream to carry the hop count message.

In a method according to an exemplifying embodiment of the invention, Ethernet protocol is used for transferring the bit stream carrying the timing messages and possible source indicator and/or hop count messages.

In a method according to an exemplifying embodiment of the invention, the timing messages are generated so that each timing message comprises a first field including first bits and a value contained by the first field is a cumulative value that has been changed with a pre-determined amount for each one of successive timing pulses contained by the timing information received from the one or more satellites. In order to minimize processing delays, each timing message is advantageously generated in advance prior to receiving the corresponding timing pulse and the timing message is included in the bit stream to be transferred to the body device in response to reception of the corresponding timing pulse.

In a method according to an exemplifying embodiment of the invention, bits of the bit stream to be transferred to the body device are set to indicate the timing messages when the said bit stream is in a form corresponding to a line-code that defines the manner the bit stream is encoded to properties of an analogue signal carrying the bit stream.

In a method according to an exemplifying embodiment of the invention, the synchronization protocol that is used between the satellite receiver module and the body device is a synchronization protocol in which a difference $\Delta\phi$ between the slave and master clock-times is computable according to the equation:

$$\Delta\phi=((T_2-T_1)-(T_4-T_3))/2,$$

where $T_1$ is a value of the master clock-time at a transmission moment of a first one of the timing messages accordant with the synchronization protocol from the master-end, $T_2$ is a value of the slave clock-time at a reception moment of the first one of the timing message at the slave-end, $T_3$ is a value of the slave clock-time at a transmission moment of a second one of the timing messages accordant with the synchronization protocol from the slave-end, and $T_4$ is a value of the master clock-time at a reception moment of the second one of the timing messages at the master-end, the satellite receiver module representing the master-end and the body device-representing the slave-end.

In a method according to an exemplifying embodiment of the invention, the synchronization protocol is according to the IEEE 1588 specification.

A computer program according to an exemplifying embodiment of the invention comprises computer executable instructions for controlling a programmable processor to carry out a method according to one or more of the above-described exemplifying embodiments of the invention.

A computer program according to an exemplifying embodiment of the invention comprises software modules for transferring timing information from a satellite receiver module of telecommunication equipment to a body device of the telecommunication equipment, where the satellite receiver module is detachably attached to the body device. The software modules comprise computer executable instructions for controlling a programmable processor of the satellite receiver module to:
run at least a part of master-end functions of a synchronization protocol suitable for synchronizing master and slave clock-times over a data transfer network,
convert timing information received from one or more satellites into timing messages that are accordant with the synchronization protocol, and
control a data interface of the satellite receiver module to transfer a bit stream carrying the timing messages to the body device of the telecommunication equipment.

The software modules can be, for example, subroutines and functions generated with a suitable programming language.

A computer program product according to an exemplifying embodiment of the invention comprises a non-volatile computer readable medium, e.g. a compact disc ("CD"), encoded with a computer program according to an embodiment of the invention.

A signal according to an exemplifying embodiment of the invention is encoded to carry information defining a computer program according to an embodiment of the invention.

The specific examples provided in the description given above should not be construed as limiting the applicability and/or the interpretation of the appended claims.

What is claimed is:

1. A satellite receiver module for telecommunication equipment, the satellite receiver module being:
a plug-in unit connectable to a body device of the telecommunication equipment, the satellite receiver module comprising:
a first circuitry for receiving timing information from one or more satellites,
a second circuitry for running at least a part of master-end functions of a synchronization protocol and for converting the timing information into timing messages that are accordant with the synchronization protocol, the synchronization protocol being suitable for synchronizing master and slave clock-times over a data transfer network, and
a data interface comprising a connector for detachably attaching to the body device of the telecommunication equipment and for transferring a bit stream carrying the timing messages to the body device of the telecommunication equipment.

2. A satellite receiver module according to claim 1, wherein the second circuitry is configured to generate a source indicator message indicating that the timing information carried by the timing messages has been received from a satellite system comprising the one or more satellites, and to set the bit stream to carry the source indicator message.

3. A satellite receiver module according to claim 1, wherein the second circuitry is configured to generate a hop count message indicating that a number of data transfer links, via which the timing information has been transferred, is zero, and to set the bit stream to carry the hop count message.

4. A satellite receiver module according to claim 1, wherein the second circuitry is configured to generate the timing messages so that each timing message comprises a first field including first bits and a value contained by the first field is a cumulative value that has been changed with a pre-determined amount for each one of successive timing pulses contained by the received timing information.

5. A satellite receiver module according to claim 4, wherein the second circuitry is configured to generate each timing message in advance prior to receiving the corresponding timing pulse contained by the received timing information and to include the timing message in the bit stream in response to reception of the corresponding timing pulse.

6. A satellite receiver module according to claim 1, wherein the data interface comprises an electrical connector comprising connector poles for providing galvanic couplings with corresponding connector poles of the body device.

7. A satellite receiver module according to claim 1, wherein the data interface comprises an optical interface for generating an optical signal carrying the bit stream.

8. A satellite receiver module according to claim 1, wherein the second circuitry is configured to set bits of the bit stream to indicate the timing messages when the bit stream is in a form corresponding to a line-code used by the data interface, the line-code defining the manner the bit stream is encoded to properties of an analogue signal of the connector.

9. A satellite receiver module according to claim 1, wherein the synchronization protocol is a synchronization protocol in which a difference $\Delta\phi$ between the slave and master clock-times is computable according to the equation:

$$\Delta\phi=((T_2-T_1)-(T_4-T_3))/2,$$

where $T_1$ is a value of the master clock-time at a transmission moment of a first one of the timing messages accordant with the synchronization protocol from a master-end, $T_2$ is a value of the slave clock-time at a reception moment of the first one of the timing message at the slave-end, $T_3$ is a value of the slave clock-time at a transmission moment of a second one of the timing messages accordant with the synchronization protocol from the slave-end, and $T_4$ is a value of the master clock-time at a reception moment of the second one of the timing messages at the master-end, the satellite receiver module representing the master-end and the body device-representing the slave-end.

10. A satellite receiver module according to claim 1, wherein the synchronization protocol is according to the IEEE 1588 specification.

11. A satellite receiver module according to any of claims 1, wherein the data interface is configured to use Ethernet protocol for transferring the bit stream to the body device of the telecommunication equipment.

12. Telecommunication equipment comprising a satellite receiver module and a body device, wherein the satellite receiver module is a plug-in unit connectable to the body device and the satellite receiver module comprises:
a first circuitry for receiving timing information from one or more satellites,
a second circuitry for running at least a part of master-end functions of a synchronization protocol and for converting the timing information into timing messages that are accordant with the synchronization protocol, the synchronization protocol being suitable for synchronizing master and slave clock-times over a data transfer network, and
a data interface comprising a connector for detachably attaching to a body device of the telecommunication equipment and for transferring a bit stream carrying the timing messages to the body device of the telecommunication equipment, and
wherein the body device comprises:

a data interface comprising a connector for detachably attaching to the connector of the data interface of the satellite receiver module, and
a processing system for running at least a part of slave-end functions of the synchronization protocol on the basis of the timing messages received from the satellite receiver module so as to regenerate the timing information received by the satellite receiver module from the one or more satellites.

13. Telecommunication equipment according to claim 12, wherein the connector of the data interface of the body device is capable of being detachably attached to a data transfer link of a data transfer network and the data interface of the body device is capable of receiving data traffic from the data transfer link of the data transfer network.

14. Telecommunication equipment according to claim 12, wherein the data interface of the body device is configured to support Ethernet protocol.

15. Telecommunication equipment according to claim 12, wherein the body device is at least one of the following: an internet protocol "IP" router, an Ethernet switch, an Asynchronous Transfer Mode "ATM" switch, a MultiProtocol Label Switching "MPLS" switch.

16. A method comprising:
receiving, at a satellite receiver module of telecommunication equipment, timing information from one or more satellites, the satellite receiver module being a plug-in unit detachably attached to a body device of the telecommunication equipment,
running, in the satellite receiver module, at least a part of master-end functions of a synchronization protocol suitable for synchronizing master and slave clock-times over a data transfer network,
converting, in the satellite receiver module, the timing information into timing messages that are accordant with the synchronization protocol,
transferring a bit stream carrying the timing messages from the satellite receiver module to the body device, and
running, in the body device, at least a part of slave-end functions of the synchronization protocol so as to regenerate the timing information received from the one or more satellites.

17. A non-transitory computer readable medium encoded with a computer program for controlling a satellite receiver module that is a plug-in unit connectable to a body device of telecommunication equipment, the computer program comprising computer executable instructions for controlling a programmable processor of the satellite module to:
run at least a part of master-end functions of a synchronization protocol suitable for synchronizing master and slave clock-times over a data transfer network,
convert timing information received from one or more satellites into timing messages that are accordant with the synchronization protocol, and
control a data interface of the satellite receiver module to transfer a bit stream carrying the timing messages to body device of the telecommunication equipment.

* * * * *